United States Patent [19]

Poehler et al.

[11] Patent Number: 4,653,744

[45] Date of Patent: Mar. 31, 1987

[54] DEVICE FOR TRANSFERRING FLAT OBJECTS BETWEEN TWO STATIONS

[75] Inventors: Hermann Poehler, Ober-Morlen; Peter Dziemba, Bad Nauheim, both of Fed. Rep. of Germany

[73] Assignee: MAP Mikrofilm Apparatebau Dr. Poehler GmbH & Co KG, Fed. Rep. of Germany

[21] Appl. No.: 699,469

[22] Filed: Feb. 8, 1985

[30] Foreign Application Priority Data

Feb. 8, 1984 [DE] Fed. Rep. of Germany ....... 3404383

[51] Int. Cl.[4] .................... B65H 5/00; B65H 5/16; G03B 21/11; G03B 23/02
[52] U.S. Cl. .................... 271/264; 198/457; 271/184; 271/225; 271/273
[58] Field of Search ............... 271/3, 4, 10, 264, 272, 271/273, 274, 225, 184, 185, 238, 240, 171; 198/457, 411, 412

[56] References Cited

U.S. PATENT DOCUMENTS

| 4,131,273 | 12/1978 | Kufrin et al. | 271/4 |
| 4,238,066 | 12/1980 | Brooke | 271/272 |
| 4,437,560 | 3/1984 | Wolf | 198/457 |
| 4,456,242 | 6/1984 | Morin | 271/225 |
| 4,544,151 | 10/1985 | Dziemba | 271/251 |

OTHER PUBLICATIONS

IBM Technical Disclosure Bulletin, "Card Turning Mechanism with Guide Wall" by K. Hagiwara, vol. 22, No. 5, Oct. 1979.

Primary Examiner—Douglas C. Butler
Assistant Examiner—John A. Carroll
Attorney, Agent, or Firm—Wegner & Bretschneider

[57] ABSTRACT

In a device for transporting flat objects from one station to another the stations are opposite each other, in the same plane, at an obtuse angle. The one station can be a film card holder, the other station a film card magazine. Since the two stations are not in line, a gap is provided between them. At the narrowest side of the gap a transport mechanism is located for transporting the objects.

5 Claims, 1 Drawing Figure

U.S. Patent   Mar. 31, 1987   4,653,744
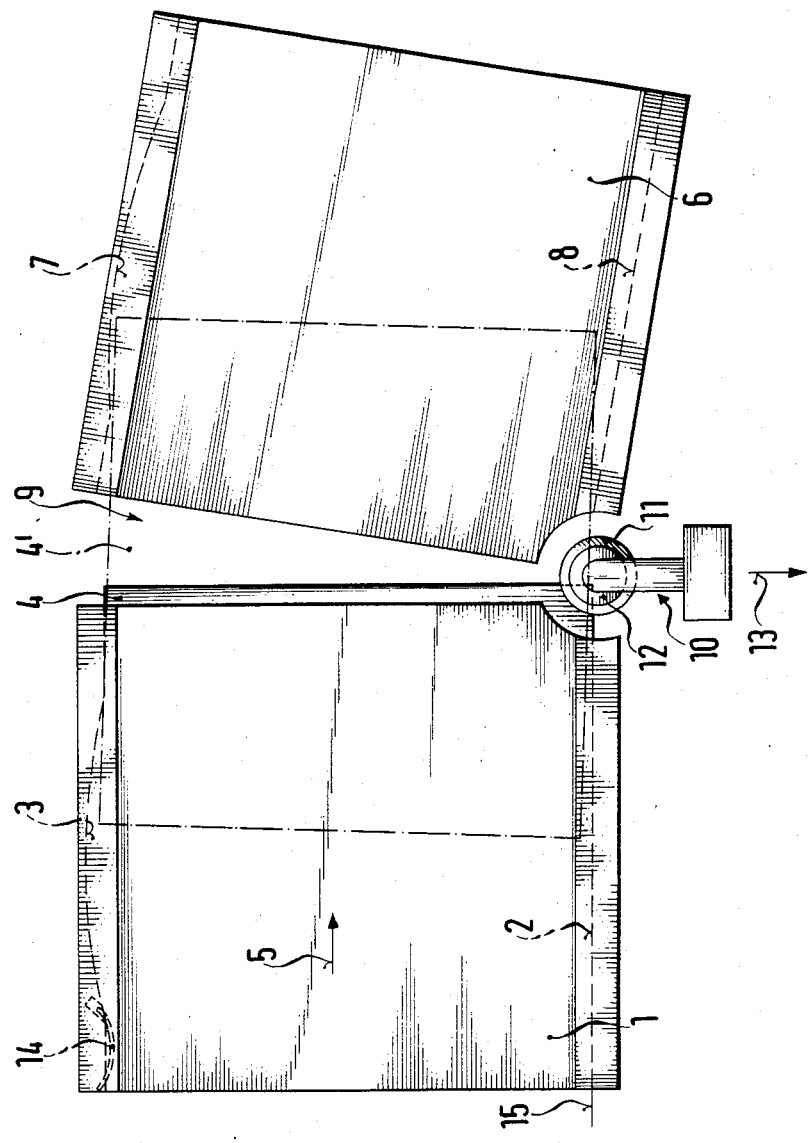

DEVICE FOR TRANSFERRING FLAT OBJECTS BETWEEN TWO STATIONS

BACKGROUND OF THE INVENTION

This invention relates to a device for transferring flat objects, for instance film cards, between two stations featuring a transport mechanism for transporting the objects from one station to the other. Both stations are provided with two guides for lateral guidance of the objects.

Devices of this kind may, for instance, be microfilm readers, with one station being a film card magazine, and the other station a film card holder. The film card to be read is automatically pulled out of the film card magazine, transported onto the film card holder, and returned automatically into the respective compartment of the film card magazine after use. As an example of the state of the art reference be made to West German Offenlegungsschrift No. 32 43 172.4.

A typical film card magazine is a box-like structure divided into compartments by partitions. Each film card is stored in one compartment. A typical film card holder is a flat surface with an opening corresponding to a single frame on the film disposed between a source of illumination and the optics of the film reader. There is usually a flat glass plate superimposed over the holder to sandwich the film card between the holder and the glass plate, the glass plate being hingedly mounted or otherwise movable with respect to the holder in order to insert and remove the film card from the holder.

Since it is desirable to design the film card magazine as small as possible, it is necessary to keep the height of the openings of the individual compartments accomodating the film cards at a minimum. If these openings become too small, however, it is rendered impossible for the film cards to be reliably inserted into the respective compartments, because they hit against the compartment partitions or against the faces of the neighboring film cards in case the latter are not exactly even but, for example, warped so that they are undulated.

Certain film cards, in particular thermally developed films (vesicular films) tend to form considerable surface undulation. A factor leading to even further undulation rests with the typical film card holder of the type which opens, since the advance of the film card is initially obstructed by the glass plate of the film card holder moving upwards. Even with compartments featuring relatively wide openings, such film cards hit against the faces of the neighboring film cards in the film card magazine, and can hence not be inserted into the film card magazine.

Of course, provision could be made of a funnel-type guiding passage between the film card holder and the film card magazine through which the film cards are to be guided, with said guiding passage narrowing towards the film card magazine. This would, however, have the disadvantage of the film cards being easily damaged by scratching.

The above problems are of course not only present with film cards, but they are posed each time flat object-carriers which are prone to deformation are inserted into a narrow slot.

SUMMARY OF THE INVENTION

The invention is based on the objective of developing a device of the kind mentioned at the outset allowing flat objects that need not be completely even to be transported with ease and within narrow tolerances from one station to another.

This object is accomplished by this invention by locating two stations opposite each other in the same plane, forming an obtuse angle in relation to their guiding directions, and hence providing a gap widening at an acute angle between them.

When the objects are transported from one station to the other, they enter the other station with one corner first as a result of the two stations is not being exactly in line. A "pick-up effect" is obtained, enabling even objects having a relatively strong surface undulation to be inserted into, for instance, narrow compartments of a film card magazine. This "pick-up effect" can be obtained with a small design expenditure, since in a microfilm reader, for example, the film card magazine need only be provided at an inclined angle in relation to the film card holder.

The gap, such as brought about by the invention, widening towards one side is very advantageous when provision is to be made of sensors for monitoring the transition area, since these sensors can be held by a support, the cross-section of which increases as a function of the increasing bending moment, this support being located at the wider side of the gap.

As a preferred embodiment of the invention, this transport mechanism is provided at the narrowest side of the gap with the former featuring two discs forming an acute angle in relation to each other that can perform a pincer-wise motion towards the information carrier.

The provision of this transport mechanism acting from one side enables the objects being transported to swivel, so as to compensate for the difference in alignment of the two stations.

It is furthermore advantageous for the two adjacent guides at the side of the transport mechanism to be straight and for the other two adjacent guides to feature a slightly convexly curved center portion, so as to compensate for the difference in alignment. This provision makes for positive lateral guidance of the flat information-carriers in final position and enables them to swivel into correct position during transport.

Furthermore the straight guides make for good guidance when the film cards are being transported.

BRIEF DESCRIPTION OF THE DRAWING

The invention will be better understood, and objects other than those set forth above will become apparent, when consideration is given to the following detailed description thereof. Such description makes reference to the annexed drawings wherein:

The single FIGURE of the drawing is top plan view, in overly simplified form, of a film card holder of a microfilm reader and of a film card magazine positioned in front of the film card holder as well as of a transport mechanism.

DESCRIPTION OF THE PREFERRED EMBODIMENT

In the left portion of the drawing a film card holder 1 is schematically illustrated featuring guides 2 and 3 at two opposite sides. The guide 2 is exactly straight, the guide 3, however, features a center portion that is slightly curved towards the outside. Between the guides 2 and 3 a film card 4, also called a microfiche, is supported on the film card holder 1, with the former being capable of sliding in the direction of the arrow 5. Through the action of a spring, not illustrated in the drawing, the film card 4' is kept in direct contact with the guide 2. The broken line marks a film card 4 in transition between the film card holder 1 and a film card magazine 6.

This film card magazine 6 is positioned next to the film card holder 1. In this film card magazine the film cards can be inserted into individual compartments in a row like slides in a slide magazine. The film card magazine 6 is vertically movable at right angles to the plane of the drawing, rendering it possible to move any film card 4 in the film card magazine 6 into the plane of the film card holder 1. As is the case of the film card holder 1, the film card magazine 6 features guides 7 and 8 by means of which the film cards 4 can be laterally guided and supported. The guide 8 is exactly straight, while the guide 7 features a center portion that is slightly curved towards the outside as does the guide 3.

It is furthermore of importance for the invention that the film card holder 1 and the film card magazine 6 be not exactly in line but that an obtuse angle be formed between them. Hence, a gap 9 forming an acute angle is present betwen these two elements.

A transport mechanism 10 is provided at the narrowest side of this gap 9 between the guides 2 and 3. This transport mechanism has two discs 11 and 12 forming an acute angle in relation to each other. At least one of the two discs can be driven by a motor. A transport mechanism of this kind is described in U.S. patent application Ser. No. 541,583, filed Oct. 13, 1983 in the name of Peter Dziemba now U.S. Pat. No. 4,544,151, and commonly assigned herewith, which is embodied herein in its entirety by reference.

When a film card 4 is to be transported from the film card holder 1 to the film card magazine 6, the two discs 11 and 12 of the transport mechanism perform a pincer-wise motion towards each other until they grip the marginal area of the film card and transport the film card towards the film card magazine as a result of the discs' rotation. The upper disc 12 is provided in such a manner that the film card 4 is subjected to a continuous force acting in the direction of the guide 8. Hence, when the film card 4 is transported into the film card magazine 6, direct contact with the guide 8 is achieved relatively fast. When the film card 4 is transported from the film card magazine to the film card holder 1, the conditions are reversed. The film card 4 is kept in direct contact with the guide 2.

We claim:

1. A two-station device for flat objects, comprising means for holding said flat objects when in use, a magazine for storing said flat objects when not in use, said holding means and said magazine being denoted as stations, a transport mechanism for transporting the objects from one station to the other, with both stations being provided with two guides each for lateral guidance of the objects, said stations being disposed opposite each other in the same plane, thereby forming an obtuse angle in relation to their guiding directions, to thereby form a gap widening at an acute angle between them, wherein the two adjacent guides of the holding means and the magazine at the side of the transport mechanism are straight and the other two adjacent guides each have a slightly curved center portion, to thereby compensate for the difference in alignment between the two stations as a result of the disposition of the same at an obtuse angle by allowing the objects to rotate while partially within both stations.

2. A device according to claim 1, wherein the transport mechanism is disposed at the narrower end of the gap and comprises two rotatable discs facing each other at an acute angle on either side of said plane to thereby perform a pincer-wise motion towards the objects.

3. A device according to claim 1, wherein said flat objects are film cards.

4. A reader for microfiche cards comprising means for holding said microfiche cards when in use, a magazine for storing said cards when not in use, said holding means and said magazine being denoted at stations, a transport mechanism for transporting the cards from one station to the other, with both stations being provided with two guides each for lateral guidance of the cards, said stations being disposed opposite each other in the same plane, thereby forming an obtuse angle in relation to their guiding directions, to thereby form a gap widening at an acute angle between them, wherein the two adjacent guides of the holding means and the magazine at the side of the transport mechanism are straight and the other two adjacent guides each have a slightly curved center portion, to thereby compensate for the difference in alignment between the two stations as a result of the disposition of the same at an obtuse angle by allowing the cards to rotate while partially within both stations.

5. A device according to claim 4, wherein the transport mechanism is disposed at the narrower end of the gap and comprises two rotatable discs facing each other at an acute angle on either side of said plane to thereby perform a pincer-wise motion towards the objects.

* * * * *